United States Patent [19]

Gutzmer

[11] Patent Number: 5,555,300
[45] Date of Patent: Sep. 10, 1996

[54] TELEPHONE HANDSET MICROPHONE LEVEL ADJUSTMENT

[76] Inventor: Howard A. Gutzmer, 4335 Grace Rd., Bonita, Calif. 92002

[21] Appl. No.: 206,944

[22] Filed: Mar. 7, 1994

[51] Int. Cl.$^6$ ............................................. H04M 11/00
[52] U.S. Cl. .................... 379/395; 379/402; 379/406; 379/443; 379/99
[58] Field of Search ........................... 379/395, 3, 6, 379/210, 223, 390, 391, 402, 351, 111, 403, 406, 409; 381/104, 111, 168

[56] References Cited

U.S. PATENT DOCUMENTS

| | | | |
|---|---|---|---|
| 4,588,856 | 5/1986 | Cohen | 379/98 |
| 4,617,656 | 10/1986 | Kobayashi et al. | 370/74 |
| 4,782,524 | 11/1988 | McQuinn et al. | 379/395 |
| 4,879,738 | 11/1989 | Petro | 379/3 |
| 4,907,267 | 3/1990 | Gutzmer | 379/442 |
| 4,989,243 | 1/1991 | Choi | 379/402 |
| 5,001,746 | 3/1991 | Nishijima | 379/99 |
| 5,321,745 | 6/1994 | Drory et al. | 379/351 |

FOREIGN PATENT DOCUMENTS

| | | |
|---|---|---|
| 0298719 | 11/1989 | European Pat. Off. . |
| 9303561 | 2/1993 | WIPO . |

Primary Examiner—Jeffery Hofsass
Assistant Examiner—Jacques M. Saint-Surin
Attorney, Agent, or Firm—Brown, Martin, Haller & McClain

[57] ABSTRACT

A system for automatically adjusting the level of a telephone instrument microphone input signal in response to the level of the telephone instrument sidetone signal. The system may provide a test signal to the handset microphone input and receive the sidetone signal that corresponds to the test signal from the handset speaker output. A signal processor may then measure the amount of distortion present in the sidetone. If the amount of distortion is below a predetermined threshold, the level of the test signal is increased by a predetermined increment by adjusting an attenuation or amplification factor, and the amount of distortion in the sidetone is again measured. These steps are repeated until the measured distortion exceeds the threshold. The level of the test signal is then decreased by a predetermined amount. The final test signal thus has a level that maximizes the microphone input signal level with an acceptable minimum of distortion. The test signal is then automatically disconnected and a signal produced by an external device, such as a modem, is automatically connected. The selected attenuation factor is thus applied to the signal produced by the external device.

28 Claims, 2 Drawing Sheets

TELEPHONE HANDSET MICROPHONE LEVEL ADJUSTMENT

BACKGROUND OF THE INVENTION

The present invention relates to telecommunications devices and, more specifically, to systems for coupling telecommunications devices to telephone instruments.

A modem is a telecommunications interface that is used between a computer, facsimile machine or similar device and a telephone line to enable the device to communicate with another like device over the telephone line. Conventional modems use a two-wire connection that is typically connected directly to a two-wire telephone line. However, in telephone systems using a PBX arrangement, where many lines are serviced by a central controller, it is difficult to achieve dedicated line service for modem communications because the telephone lines carry line selection information and power in addition to the audio frequency communication signals.

U.S. Pat. No. 4,907,267, issued to Gutzmer, entitled "MODEM INTERFACE DEVICE," discloses a system for interfacing a modem to a PBX telephone system. The interface system is connected between the modem and the handset jack of a telephone instrument. The interface system thus provides audio frequency signals directly to the microphone input of the telephone instrument via the handset jack and receives audio frequency signals directly from the speaker output of the telephone instrument via the handset jack. The handset that was unplugged from the telephone instrument in order to plug in the interface system may be plugged into the interface system via another jack, and a switch is provided to allow either the modem or handset to be selectively connected to the handset jack. However, it is often desirable to use not the handset that was provided with the telephone instrument by its manufacturer, but a headset that a user can wear to allow hands-free conversation.

The optimal microphone input signal level for a telephone instrument may vary among telephone instruments produced by different manufacturers and even among different types of telephone instruments produced by the same manufacturer. An interface system that connects directly to the telephone handset jack thus may not work optimally with all telephone instruments. If the input signal level is fixed, that level may be too low for some telephone instruments and too high for others. A signal level that is too high or too low may cause data transmission errors when a modem is connected to the telephone instrument via such an interface system. In addition, oral communication may be impeded when a headset is connected to a telephone instrument if the headset is not specifically designed for compatibility with that telephone instrument because a signal that is too high or too low may render speech unintelligible.

Practitioners in the art have used circuits comprising multiple-position switches to manually select a microphone input level. A user of such a device may need to empirically determine which, if any, of the available input levels produces the fewest transmission errors when the interface device is connected to a modem or the clearest sound quality when the interface device is connected to a handset or headset. Such experimentation is clearly inconvenient and time-consuming.

A system for automatically adjusting the microphone input level to an optimum value would be highly desirable. These problems and deficiencies are clearly felt in the art and are solved by the present invention in the manner described below.

SUMMARY OF THE INVENTION

The present invention comprises a circuit for automatically adjusting the level of a telephone instrument microphone input signal in response to the level of the telephone instrument sidetone signal. The sidetone signal, as it is known in the art, is the feedback signal between the handset microphone and the handset speaker that allows a user to hear through the handset speaker the sounds that the handset microphone detects.

In an illustrative embodiment, the present invention produces a test signal having a predetermined initial level. The present invention provides the test signal having a preset level to the microphone input via the telephone instrument handset jack or via an acoustical coupler coupled to the handset. The present invention receives the sidetone signal that corresponds to the test signal from the speaker output via the telephone instrument handset jack or via an acoustical coupler coupled to the handset. The present invention measures the amount of distortion present in the sidetone using any suitable method. If the amount of distortion is below a predetermined threshold, the present invention increases the level of the test signal by a predetermined increment by adjusting an attenuation or amplification factor and again measures the amount of distortion in the sidetone. The present invention repeats these steps until the measured distortion exceeds the predetermined threshold. The present invention then decreases the level of the test signal by a predetermined amount by adjusting the attenuation or amplification factor. The final test signal thus has an optimal level that maximizes the microphone input signal level with an acceptable minimum of distortion. The present invention may perform the above-described method at any time, such as upon detection of a dial tone or any other signal produced by the telephone instrument or the telecommunications device to which the present invention is connected.

After performing the above-described method, the present invention may disconnect the test signal and connect a signal produced by an external device, such as a modem, a headset, or a digital serial port of a computer. The selected attenuation or amplification factor is thus applied to the signal produced by the external device during its normal operation. If the external device is a modem or computer serial port, the microphone input signal remains at an optimal level because all modems have a standard output level and all computer serial ports have a standard output level to which the level of the test signal is preset. If the external device is a headset or other device with a non-standard output level, a preamplifier circuit may be included at the external device input to adjust the input level to equal the level to which the test signal is preset.

In an illustrative embodiment, a digital signal processor and associated circuitry and software perform the above-described method. However, other types of analog or digital circuitry may be suitable.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF THE PREFERRED EMBODIMENT

Figure 1:
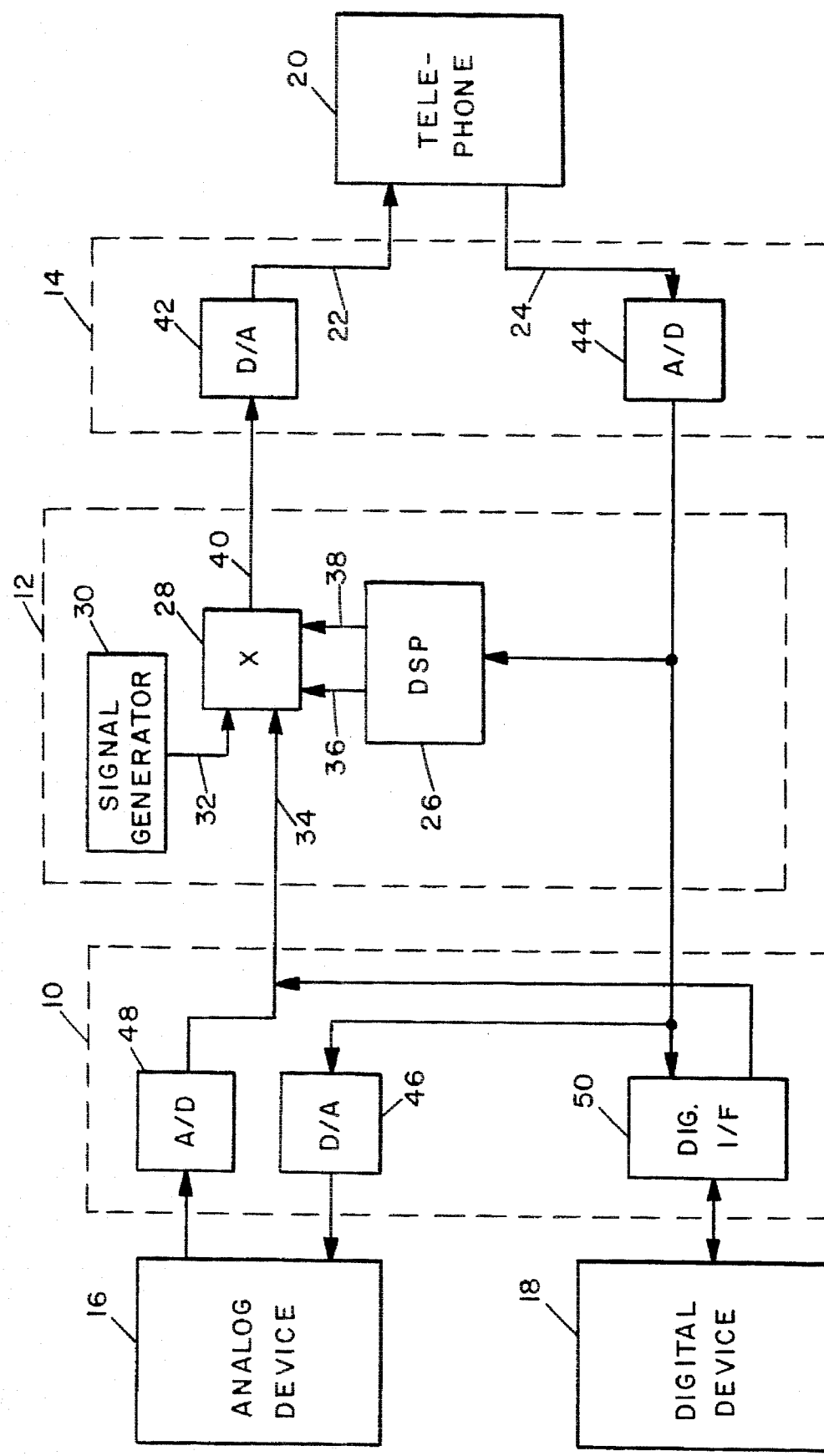
FIG. 1 is a diagrammatic view of a telephone handset microphone level adjustment system.

As illustrated in FIG. 1, the present invention comprises a device interface 10, an adaptation circuit 12, and a telephone interface 14. Device interface 10 interfaces the present invention at least one external analog device 16, such as a modem or a telephone headset, with at least one external digital device 18, such as a computer serial port, or with both. Although device interface 10 is shown as including one analog and one digital interface, in other embodiments device interface 10 may consist of only an analog interface, only a digital interface, or multiple interfaces of one or both types. For example, one analog interface may be provided for connecting a modem, and another analog interface may be provided for connecting a headset. Telephone interface 14 is connected to a telephone instrument 20 via the handset jack (not shown) or via an acoustical coupler (not shown) coupled to the handset. This connection comprises a telephone instrument microphone signal 22 and a telephone instrument speaker signal 24.

The word "adaptation," as used herein, is the process of automatically adjusting microphone signal 22 in response to speaker signal 24. Adaptation circuit 12 comprises a digital signal processor 26, an variable attenuator 28, and a signal generator 30.

Digital signal processor (DSP) 26 may comprise an integrated circuit chip (not shown) and associated memory (not shown) for programming the chip. As known in the art, such chips may be programmed to acquire a number of samples in an internal buffer, perform Fourier transforms on the samples, and analyze the frequency components of the resulting spectrum.

Attenuator 28 may be a discrete multiplier integrated circuit or may be integral with DSP 26 or integral with telephone interface 14, as described below in greater detail. Attenuator 28 receives a test signal 32 from signal generator 30 and a device signal 34 from device interface 10. The predetermined level of test signal 32 should be set to equal the level of device signal 34. Device interface 10 should include suitable preamplifcation circuitry (not shown) for equalizing the various external device inputs to produce a device signal 34 having the same predetermined level regardless of the particular external device that is in use. The preamplification factor for an input to interface 10 that is dedicated to modems can be readily determined because the output levels of modems are standardized. Similarly, the preamplification factor for an input to interface 10 that is dedicated to digital data produced by a computer serial port can be readily determined because digital output levels of computer serial ports are standardized. The preamplification factor for an input to interface 10 that is dedicated to headsets may be determined by measuring the average output level of a headset of the type to be used or by obtaining this information from the manufacturer of that headset.

Attenuator 28 also receives an attenuation value 36 and a select signal 38 from DSP 26. In response to select signal 38, attenuator 28 multiplies either test signal 32 or device signal 34 by attenuation value 36 to produce an attenuated signal 40. It should be noted that although the present embodiment describes the adaptation process as including attenuation, other embodiments may include amplification or a combination of attenuation and amplification.

Telephone interface 14 comprises any suitable circuitry for interfacing adaptation circuit 12 with telephone 20 and may include a digital-to-analog converter 42 and an analog-to-digital converter 44. Although telephone interface 14 is illustrated as including such discrete converters for purposes of clarity, telephone interface 14 may be an integrated coder-decoder (codec) of any suitable type. Furthermore, as known in the art, some types of codecs can internally perform attenuation on the data they receive. Such codecs may have one input to which the data word is provided and another input to which the attenuation value is provided, or may have a single input to which composite data words containing both the data and its corresponding attenuation value is provided. Other types of codecs cannot perform attenuation, and DSP 26 may be used to internally multiply the data by the attenuation value. Still other types of codecs have limited attenuation control. Such codecs can be used to provide a coarse attenuation, and DSP 26 may be used to internally perform any remaining attenuation that is necessary. Regardless of the specific circuit design, which persons of skill in the art will readily be able to construct, attenuator 28 is illustrated as a discrete component in FIG. 1 for purposes of clarity.

Device interface 10 is also shown in a simplified form for purposes of clarity, and may comprise any suitable circuitry for interfacing with external communications devices. To interface with analog device 16, device interface 10 may include a digital-to-analog converter 46 and an analog-to-digital converter 48. To interface with digital device 18, device interface 10 may comprise any suitable type of digital interface circuit 50.

Figure 2:
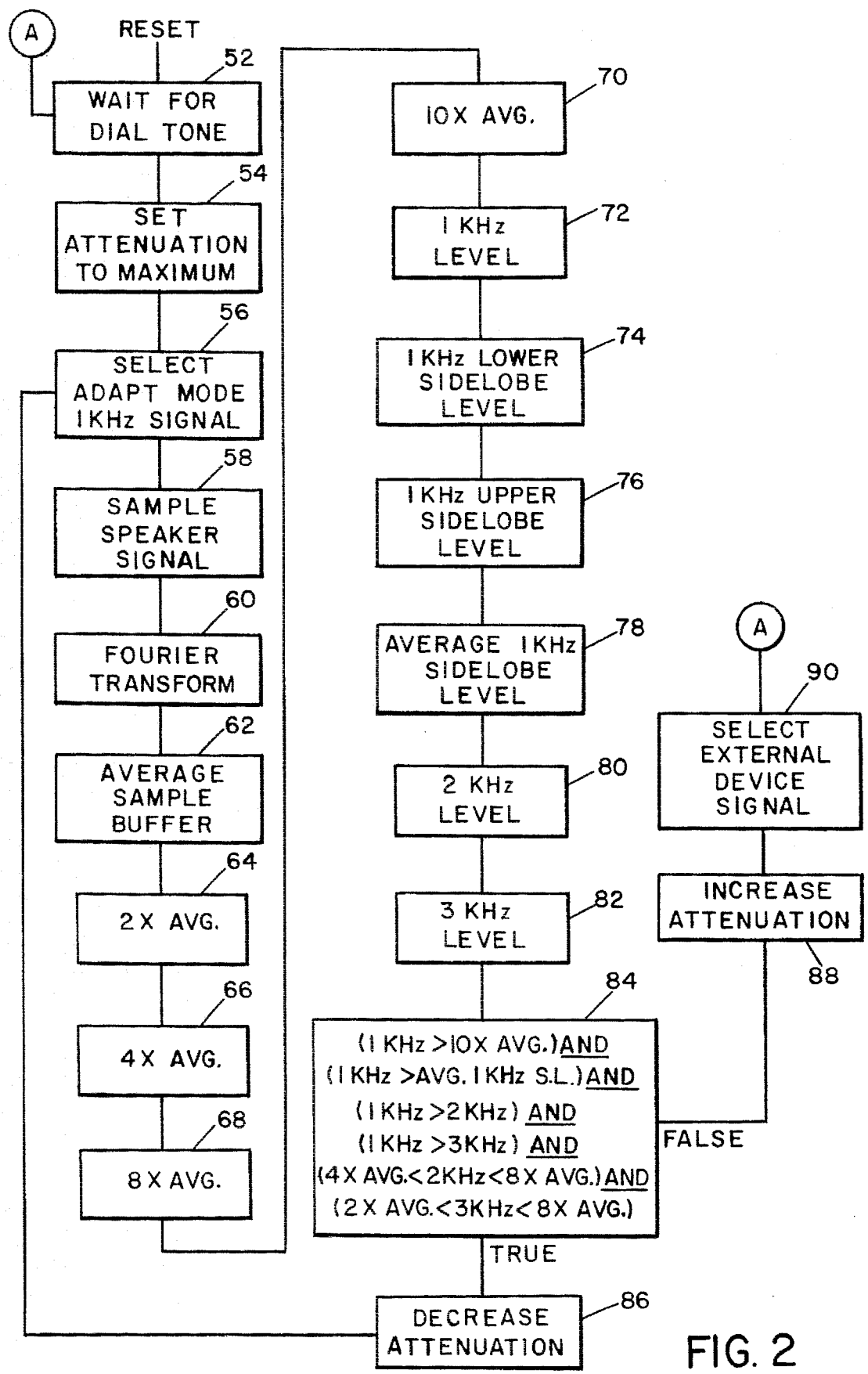
FIG. 2 is a flow diagram, illustrating a method for adjusting the microphone level.

The preferred attenuation process, illustrated in detail in FIG. 2, essentially comprises providing a test signal having a predetermined amplitude and a predetermined main frequency to the microphone input of telephone instrument 20 via microphone signal 22. DSP 26 monitors the speaker output of telephone instrument 24 via speaker signal 24. If the level of microphone signal 22 is within an acceptable range, speaker signal 24 should be an identical reproduction of test signal 32. However, the level of microphone signal 22 may be too low for acceptable communication if the level of speaker signal 24 is very low, and the level of microphone signal 22 may be too high if speaker signal 24 is distorted relative to test signal 32. Therefore, DSP 26 sequentially decreases attenuation value 36 by a predetermined increment until it detects distortion in speaker signal 24. DSP may measure distortion using any suitable method. The preferred method includes measuring the amplitude of one or more harmonics of test signal 32 that may be present in speaker signal 24. These harmonics tend to increase in amplitude with increases in distortion. The highest level at which speaker signal 24 remains undistorted is an optimal level for communications.

As illustrated in FIG. 2, DSP 26 may execute software for performing the preferred adaptation process upon the occurrence of any suitable event. For example, DSP 26 may wait at step 52 until it detects a dial tone present in speaker signal 24, which is received via telephone interface 14. At step 54 DSP 26 sets attenuation value 36 to a predetermined maximum value, which is preferably about 45 decibels below one milliwatt (dBm). At step 56 DSP 26 sets select signal 38 to a value that selects test signal 32 as the input to be attenuated. Signal generator 30 preferably produces a test signal 32 consisting of a sinewave having a frequency of 1 kilohertz (kHz).

At step 58 DSP 26 samples speaker signal 24 via telephone interface 14. A preferred number of samples is 256 at a sampling rate of 125 microseconds (µs). These values yield a frequency delta of approximately 31 µs between successive samples and a frequency spectrum is from zero to 8 kHz. As will be appreciated by persons skilled in the art, the usable spectrum is one-half this frequency range. At step 60 DSP 26 performs a Fourier transform on the samples. DSP 26 can thus measure the amplitude of the signal at any frequency between zero and 4 kHz that is a multiple of 31 Hz.

At step 62 DSP 26 calculates the average of all 256 samples to produce an average signal level, denoted herein by the variable "AVG". At steps 64, 66, 68, and 70, respectively, DSP 26 calculates values equal to two times AVG, denoted "2XAVG", four times AVG, denoted "4XAVG", eight times AVG, denoted "8XAVG", and ten times AVG, denoted "10XAVG".

At step 72 DSP 26 measures the amplitude at a frequency of approximately 1 kHz, denoted by the variable "1 KHZ". At steps 74 and 76, DSP 26 measures the amplitudes of the lower and upper sidelobes of this 1 kHz signal at frequencies of 968 Hz and 1031 Hz, respectively. At step 78 DSP 26 calculates the average of the upper and lower 1 kHz sidelobes, denoted "AVG_1KHZ_SL". At steps 80 and 82 DSP measures the amplitudes at frequencies of 2 kHz and 3 kHz, respectively. These measurements represent the first even and odd harmonics of the main 1 kHz frequency and are denoted "2 KHZ" and "3 KHZ", respectively.

At step 84 DSP 26 calculates the state of the following empirically-derived logical expression involving the above-mentioned variables:

(1KHZ>10XAVG) AND (1KHZ>AVG_1KHZ_SL) AND (1KHZ>2KHZ) AND (1KHZ>3KHZ) AND (2KHZ>4XAVG) AND (2KHZ<8XAVG) AND (3KHZ>2XAVG) AND (3KHZ<8XAVG).

If this logical expression is true, distortion is said to be below a threshold level and, at step 86, DSP decreases attenuation value 36, thereby increasing the level of microphone signal 22. DSP 26 then returns to step 56 and repeats the above-described steps to determine if speaker signal 24 becomes distorted in response to the increase in the level of microphone signal 22. If this logical expression is false, distortion is said to exceed the threshold level and, at step 88, DSP 26 increases attenuation value 36, thereby decreasing the level of microphone signal 22.

The amount by which attenuation value 36 is decreased or increased in steps 86 and 88, respectively, is preferably about 3 decibels (dB). After increasing attenuation value 36 to its previous level, at which any distortion was previously determined to be below the threshold, DSP 26, at step 90, sets select signal 38 to a value that selects device signal 34 as the input to be attenuated. Following step 90 DSP 26 returns to step 52 to await a new dial tone. Device signal 34 is then continuously attenuated by the attenuation value that was previously set, and attenuated signal 40 is provided to the microphone input of telephone instrument 20 via telephone interface 14 until DSP 26 either detects a new dial tone or is manually reset. The external device thus operates in its normal mode, and the operation of the present invention is completely transparent.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A signal level adjustment apparatus connectable to a telephone instrument, wherein the telephone instrument, in response to a microphone signal, produces a sidetone speaker signal corresponding to the microphone signal, the apparatus comprising:

telephone interface means for receiving a speaker signal from a telephone instrument and for providing a microphone signal to said telephone instrument, said speaker signal having a speaker signal level, said microphone signal having a microphone signal level;

device interface means for receiving a device signal from a telecommunications device; and adaptation means for receiving said speaker signal, for producing said microphone signal in response to said device signal, and for adjusting said microphone signal level in response to said speaker signal corresponding to said microphone signal.

2. The signal level adjustment apparatus recited in claim 1, wherein:

said adaptation means produces a test signal having a test signal frequency;

said adaptation means selectively produces said microphone signal either in response to said device signal or in response to said test signal;

said adaptation means adjusts said microphone signal level to an adjusted level in response to said speaker signal level only when said adaptation means produces said microphone signal in response to said test signal; and said adaptation means maintains said microphone signal level at said adjusted level when said adaptation means produces said microphone signal in response to said device signal.

3. The signal level adjustment apparatus recited in claim 2, wherein:

said adaptation means detects whether a dial tone is present in said speaker signal; and said adaptation means produces said microphone signal in response to said test signal when said adaptation means detects said dial tone.

4. The signal level adjustment apparatus recited in claim 1, wherein:

said adaptation means comprises distortion detection means for detecting distortion in said speaker signal; and said adaptation means adjusts said microphone signal level in response to said distortion detection means.

5. The signal level adjustment apparatus recited in claim 4, wherein:

said adaptation means detects whether a dial tone is present in said speaker signal; and said adaptation means adjusts said microphone signal in response to said distortion detection means when said adaptation means detects said dial tone.

6. The signal level adjustment apparatus recited in claim 4, wherein said adaptation means increases said microphone signal level when said distortion detection means does not detect distortion exceeding a predetermined threshold.

7. The signal level adjustment apparatus recited in claim 4, wherein said adaptation means decreases said microphone signal level when said distortion detection means detects distortion exceeding a predetermined threshold.

8. The signal level adjustment apparatus recited in claim 4, wherein:
said adaptation means increases said microphone signal level when said distortion detection means does not detect distortion exceeding a predetermined threshold; and
said adaptation means decreases said microphone signal level when said distortion detection means detects distortion exceeding a predetermined threshold.

9. The signal level adjustment apparatus recited in claim 4, wherein:
said adaptation means produces a test signal having a test signal frequency;
said adaptation means selectively produces said microphone signal either in response to said device signal or in response to said test signal; and
said adaptation means adjusts said microphone signal level to an adjusted level in response to said speaker signal level only when said adaptation means produces said microphone signal in response to said test signal; and
said adaptation means maintains said microphone signal level at said adjusted level when said adaptation means produces said microphone signal in response to said device signal.

10. The signal level adjustment apparatus recited in claim 9, wherein:
said adaptation means detects whether a dial tone is present in said speaker signal; and
said adaptation means produces said microphone signal in response to said test signal when said adaptation means detects said dial tone.

11. The signal level adjustment apparatus recited in claim 9, wherein said adaptation means increases said microphone signal level when said distortion detection means does not detect distortion exceeding a predetermined threshold.

12. The signal level adjustment apparatus recited in claim 11, wherein:
said adaptation means comprises frequency means for measuring the amplitude of said speaker signal at a frequency equal to a harmonic of said test signal frequency; and
said distortion detection means detects said distortion in response to said amplitude of said harmonic.

13. The signal level adjustment apparatus recited in claim 12, wherein said frequency means comprises transform means for performing a Fast Fourier Transform on said speaker signal.

14. The signal level adjustment apparatus recited in claim 9, wherein said adaptation means decreases said microphone signal level when said distortion detection means detects distortion exceeding said predetermined threshold.

15. The signal level adjustment apparatus recited in claim 14, wherein:
said adaptation means comprises frequency means for measuring the amplitude of said speaker signal at a frequency equal to a harmonic of said test signal frequency; and
said distortion detection means detects said distortion in response to said amplitude of said harmonic.

16. The signal level adjustment apparatus recited in claim 15, wherein said frequency means comprises transform means for performing a Fast Fourier Transform on said speaker signal.

17. A method for adjusting a signal level, comprising the steps of:
providing a signal level adjustment apparatus connectable to a telephone instrument, wherein the telephone instrument, in response to a microphone signal, produces a sidetone speaker signal corresponding to the microphone signal;
receiving a speaker signal from a telephone instrument, said speaker signal having a speaker signal level;
providing a microphone signal to a telephone instrument, said microphone signal having a microphone signal level; and
adjusting said microphone signal level in response to said speaker signal corresponding to said microphone signal.

18. The method recited in claim 17, wherein:
said method further comprises the steps of:
receiving a device signal; and
producing a test signal having a test signal frequency;
said step of providing a microphone signal comprises the step of selectively producing said microphone signal in response to either said device signal or in response to said test signal;
said microphone signal level is adjusted to an adjusted level in response to said speaker signal level only when said microphone signal is produced in response to said test signal; and
said microphone signal level is maintained at said adjusted level when said adaptation means produces said microphone signal in response to said device signal.

19. The method recited in claim 18, wherein said step of selectively producing said microphone signal comprises the step of detecting whether a dial tone is present in said speaker signal.

20. A method for adjusting a signal level, comprising the steps of:
receiving a speaker signal, said speaker signal having a speaker signal level;
providing a microphone signal, said microphone signal having a microphone signal level;
measuring distortion in said speaker signal; and
adjusting said microphone signal level in response to said measured distortion.

21. The method recited in claim 20, wherein:
said method further comprises the steps of:
receiving a device signal; and
producing a test signal having a test signal frequency;
said step of providing a microphone signal comprises the step of selectively producing said microphone signal in response to either said device signal or in response to said test signal;
said microphone signal level is adjusted to an adjusted level in response to said speaker signal level only when said microphone signal is produced in response to said test signal; and
said microphone signal level is maintained at said adjusted level when said adaptation means produces said microphone signal in response to said device signal.

22. The method recited in claim 21, wherein said step of selectively producing said microphone signal comprises the step of detecting whether a dial tone is present in said speaker signal.

23. The signal level adjustment apparatus recited in claim 20, wherein said step of adjusting said microphone signal level in response to said measured distortion comprises the steps of:

comparing said measured distortion to a predetermined threshold; and increasing said microphone signal level when said distortion does not exceed a predetermined threshold.

24. The signal level adjustment apparatus recited in claim 23, wherein said step of measuring distortion in said speaker signal comprises the step of measuring the amplitude of said speaker signal at a frequency equal to a harmonic of said test signal frequency.

25. The signal level adjustment apparatus recited in claim 24, wherein said step of measuring the amplitude of said speaker signal at a frequency equal to a harmonic of said test signal frequency comprises the step of performing a Fast Fourier Transform on said speaker signal.

26. The signal level adjustment apparatus recited in claim 20, wherein said step of adjusting said microphone signal level in response to said measured distortion comprises the steps of:

comparing said measured distortion to a predetermined threshold; and increasing said microphone signal level when said distortion does not exceed a predetermined threshold.

27. The signal level adjustment apparatus recited in claim 26, wherein said step of measuring distortion in said speaker signal comprises the step of measuring the amplitude of said speaker signal at a frequency equal to a harmonic of said test signal frequency.

28. The signal level adjustment apparatus recited in claim 27, wherein said step of measuring the amplitude of said speaker signal at a frequency equal to a harmonic of said test signal frequency comprises the step of performing a Fast Fourier Transform on said speaker signal.

* * * * *